(12) United States Patent  
Terry et al.

(10) Patent No.: US 7,533,134 B2  
(45) Date of Patent: May 12, 2009

(54) SYSTEMS AND METHODS FOR THE PROPAGATION OF CONFLICT RESOLUTION TO ENFORCE ITEM CONVERGENCE (I.E., DATA CONVERGENCE)

(75) Inventors: Douglas B. Terry, San Carlos, CA (US); Irena Hudis, Bellevue, WA (US); Lev Novik, Bellevue, WA (US); Vivek Jawahir Jhaveri, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 401 days.

(21) Appl. No.: 10/932,474

(22) Filed: Sep. 1, 2004

(65) Prior Publication Data

US 2005/0223117 A1 Oct. 6, 2005

Related U.S. Application Data

(60) Provisional application No. 60/558,388, filed on Apr. 1, 2004.

(51) Int. Cl.  
*G06F 17/30* (2006.01)

(52) U.S. Cl. .............. 707/203; 707/8; 707/10; 707/201; 707/204; 709/219; 709/236; 455/502; 455/462

(58) Field of Classification Search .......... 707/10, 707/202–204, 201, 8; 709/219, 236; 455/502, 455/462

See application file for complete search history.

(56) References Cited

U.S. PATENT DOCUMENTS

| | | | | |
|---|---|---|---|---|
| 5,710,922 A | * | 1/1998 | Alley et al. ............. | 707/201 |
| 5,774,717 A | * | 6/1998 | Porcaro ................. | 707/202 |
| 5,806,074 A | * | 9/1998 | Souder et al. .......... | 707/201 |
| 5,900,870 A | | 5/1999 | Malone et al. ......... | 345/333 |
| 6,047,291 A | | 4/2000 | Anderson et al. ...... | 707/103 |
| 6,052,735 A | * | 4/2000 | Ulrich et al. ........... | 709/236 |
| 6,108,004 A | | 8/2000 | Medl .................... | 345/346 |
| 6,112,024 A | * | 8/2000 | Almond et al. ........ | 717/122 |

(Continued)

FOREIGN PATENT DOCUMENTS

EP  0 974 895  1/2000

OTHER PUBLICATIONS

Mazzola Paluska, J. et al., "Footloose: A Case for Physical Eventual Consistency and Selective Conflict Resolution", *Proceedings of the 5th IEEE Workshop on Mobile Computing Systems and Applications*, 2003, 170-179.

(Continued)

*Primary Examiner*—Hosain T Alam  
*Assistant Examiner*—Syling Yen  
(74) *Attorney, Agent, or Firm*—Woodcock Washburn LLP

(57) ABSTRACT

Various embodiments of the present invention are directed to systems and method for detecting conflicts and applying conflict resolutions during manual and automatic conflict resolution operations. Several embodiments are directed to preventing both: (a) non-convergence of conflict resolutions, where partners can end up in a divergent steady state (i.e. have different data in the absence of outstanding conflicts); and (b) a non-terminating ping-pong of conflict resolutions between partners (which can occur with certain inefficient solutions that continuously update metadata for each conflict resolution without end). Certain specific embodiments of the present invention are directed to a method for maintaining knowledge that guarantees convergence of data, even when different partners apply different conflict resolutions.

3 Claims, 5 Drawing Sheets

U.S. PATENT DOCUMENTS

| | | | |
|---|---|---|---|
| 6,199,195 B1 | 3/2001 | Goodwin et al. | 717/1 |
| 6,240,414 B1* | 5/2001 | Beizer et al. | 707/8 |
| 6,317,754 B1* | 11/2001 | Peng | 707/203 |
| 6,338,056 B1 | 1/2002 | Dessloch et al. | 707/2 |
| 6,370,541 B1 | 4/2002 | Chou et al. | 707/103 |
| 6,477,564 B1 | 11/2002 | Freyssinet et al. | 709/202 |
| 6,519,597 B1 | 2/2003 | Cheng et al. | 707/10 |
| 6,556,983 B1 | 4/2003 | Altschuler et al. | 706/55 |
| 6,578,046 B2 | 6/2003 | Chang et al. | 707/103 |
| 6,671,757 B1 | 12/2003 | Multer et al. | 710/100 |
| 6,694,336 B1 | 2/2004 | Multer et al. | 707/201 |
| 6,708,221 B1* | 3/2004 | Mendez et al. | 709/248 |
| 6,738,789 B2 | 5/2004 | Multer et al. | 707/201 |
| 6,757,696 B2 | 6/2004 | Multer et al. | 707/201 |
| 6,757,896 B1* | 6/2004 | Cohen et al. | 718/100 |
| 6,772,178 B2 | 8/2004 | Mandal et al. | 707/204 |
| 2002/0059425 A1* | 5/2002 | Belfiore | 709/226 |
| 2002/0091702 A1 | 7/2002 | Mullins | 707/100 |
| 2002/0143521 A1 | 10/2002 | Call | 704/1 |
| 2002/0152422 A1 | 10/2002 | Sharma et al. | 714/13 |
| 2002/0198891 A1 | 12/2002 | Li et al. | 707/102 |
| 2003/0158839 A1 | 8/2003 | Faybishenko et al. | 707/3 |
| 2004/0024795 A1* | 2/2004 | Hind et al. | 707/204 |
| 2004/0267834 A1* | 12/2004 | Sasaki et al. | 707/201 |

OTHER PUBLICATIONS

Huang, Yun-Wu. Et al., "Lightweight Version Vectors for Pervasive Computing Devices", *IEEE*, 2000, 43-48.

Andrews, T. et al., "Combining Language and Database Advances in an Object-Oriented Development Environment", *OOPSLA Proceedings*, Oct. 4-8, 1987, 430-440.

Beard, et al., "Multilevel and Graphical Views of Metadata", *Research and Technology Advances in Digital Libraries*, 1998, 256-265.

Beitner, N.D. et al., "Multimedia Support and Authoring in Microcosm: An Extended Model", *Department of Electronics and Computer Science*, University of Southampton, 12 pages.

Berg, C., How Do i Create Persistent Java Objects? *Dr. Dobb's Journal*, 1997, 22(4), 98-101.

Bhattacharya, S. et al., "Coordinating Backup/Recovery and Data Consistency Between Database and File Systems", *International Conference on Management of Data and Symposium on Principles of Database Systems, Proceedings of the 2002 ACM SIGMOD International Conference on Management of Data*, 2002, 500-511.

Biliris, A., "The Performance of Three Database Storage Structures for Managing Large Objects", *ACM SIGMOD*, 1992, 276-285.

Booch, G. Benjamin/Cummings Publishing Co, "Object-Oriented Analysis and Design with Applications", 1994, 155, 156, 179-183.

Bracchi et al., "Binary Logical Associations in Data Modelling", *Modelling in Data Base Management Systems G.M. Nijssen, (ed); North Holland Publishing Company*: 1976, 125-147.

Buneman, P. et al., Inheritance and Persistence in Database Programming Languages, *ACM*, 1986, 4-15.

Chien, A.A., "Concurrent Aggregates (CA)—Design and Experience with a Concurrent Object—Oriented Language Based on Aggregates", *J. Parallel and Distributed Computing*, 1995, 25(2), 174-196.

Chryssostomidis, Chryssosiomos, et al. "Geometric Modeling Issues in Computer Aided Design of Marine Structures", *MTS Journal*, 22(2) pp. 15-33.

"Computervision Launches Design Automation Development Platform for Windows", *PR Newswire*, Financial News, Jan. 10, 1995.

D'Andrea, A. et al., "Unisql's Next Generation Object-Relational Database Management System", *ACM SIGMOD Record*, Sep. 1996, 25(2), 70-76.

Darby, C., Object Serialization in Java 1.1. Making Objects Persistent, *WEB Techniques*, 1997, 2(9), 55, 58-59.

"Developer's Guide to Apple Data Detectors—For Version 1.0.2", © Apple Computer, Inc., 1997, 1-34.

Dietrich, Walter C., Jr., et al., "TGMS: An Object-Oriented System for Programming Geometry", *Software-Practice and Experience*, Oct. 1989, 19(10), 979-1013.

Dobashi, Y. et al, "Skylight for Interior Lighting Design", *Computer Graphics Forum*, 1994, 13(3), C85-C96.

Dorsch, Jeff, "Accel Signs with IBM to Buy Altium PCB Unit-Accel Technologies Acquires the Assets to Altium's P-CAD Business Unit", *EDA Licensing, Electronic New*, Jan. 16, 1995, 4 pages.

Fegaras, Leonidas, "Optimizing Object Queries Using an Effective Calculus", *ACM Transactions on Database Systems*, Dec. 2000, 25(4), 457-516.

Findler, R.B. et al., Contract Soundness for Object-Oriented Languages ACM Conference on Object-Oriented Programming Systems, Languages, and Applications, *OOPSLA*, 2001, 15 pages.

Foley et al., Computer Graphics: Principles and Practices, Second Edition, Addison-Wesley Publishing Company, 1990, Ch. 5 and 9, pp. 201-283.

Friis, A.-Christensen, et al. "Geographic Data Modeling: Requirements and Research Issues in Geographic Data Modeling," Nov. 2001, *Proceedings of the 9th ACM International Symposium on Advances in Geographic Information Systems*, 2-8.

Fuh, Y-C. et al, "Implementation of SQL3 Structured Types with Inheritance and Value Substitutability", *Digital Symposium Collection*, 2000, Abstract only, 2 pages, www.acm.org/sigmod/disc/p_implementationoyostw.htm.

Garret, J.H., Jr. et al, "An Object Oriented Environment for Representing Building Design and Construction Data", *Advanced Construction Technology Center*, Jun. 1989, Document No. 89-37-04, 1-34.

Godoy Simões, M. et al, "A RISC-Microcontroller Based Photovoltaic System for Illumination Applications", *APEC 2000. Fifteenth Annual IEEE Applied Power Electronics Conference and Exposition*, Feb. 6-10, 2000, 2, 1151-1156.

Goscinski, A. "Distributed Operating Systems The Logical Design", *Addison-Wesley*, 1991, 306-313.

Harrison, C.J. et al., "Structure Editors: User-Defined Type Values and Type Inference", *IEEE*, 2000, 241-247.

Haverlock, K., "Object Serialization, Java, and C++", *Dr. Dobb's Journal*, 1998, 23(8), 32, 34, 36-37.

Hay, David C, "Data Model Patterns: Convention of Thought", (Dorset House Publishing, New York, NY 1996, 47-67, 235-259.

Hernandez, M.A. et al, "The Merge/Purge Problem for Large Databases, International Conference on Management of Data and Symposium on Principles of Database Systems", *Proceedings of the 1995 ACM SIGMOD International Conference on Management of Data*, 1995, 127-138.

Hsiao, H.I. et al., "DLFM: A Transactional Resource Manager", *SIGMOD, Proceedings of the 2000 ACM SIGMOD International Conference on Management of Data*, 2000, 518-528.

Kaneko, K, et al, "Design of 3D CG Data Model of Move Animation Database System", *Advanced Database Research and Development Series, vol. 3, Proceedings of the Second Far-East Workshop On Future Database Systems*, 1992, 364-372.

Kaneko, K. et al., Towards Dynamics Animation on Object-Oriented Animation Database System Move, *Advanced Database Research and Development Series, vol. 4, Database Systems for Advanced Applications* 1993, 3-10.

Katz, R.H., "Toward a Unified Framework for Version Modeling in Engineering Databases", *ACM Computing Surveys*, 1990, 22(4), 375-408.

Kawabe, S. et al, "A Framework for 3D Modeling Constraint-Based Description and Non-Manifold Geometric Modeling", *A Collection of Contributions based on Lectures Presented at the 2d Toyota Conference, Organization of Engineering Knowledge for Product Modelling in Computer Integrated Manufacturing*, Japan, Oct. 2-5, 1988, 325-357.

Kempfer, L., "CAD Jumps on Windows 3.1 Bandwagon", *Computer Aided Engineering*, 1993, 24-25.

Khan, L. et al, A Performance Evaluation of Storing XML Data in Relational Database Management Systems, *WIDM*, 2001, 31-38.

Khoshafian, S. et al, "Object Identify", *OOPSLA'86*, 1986, 21, 406-416.

Kiesling, R., "ODBC in UNIX Environments", *Dr. Dobb's Journal*, Dec. 2002, 27(12), 16-22.

King et al, "TriStarp—An Investigation into the Implementation and Exploitation of Binary Relational Storage Structures", *Proc. 8.sup.th BNCOD(British National Conference On Data Bases)*, pp. 64-84 (York 1990).

Krouse, J.K., "Geometric Models for CAD/CAM", *Machine Design*, Jul. 24, 1990, 99-105.

LeBlanc, Andrew R., et al, "Design Data Storage and Extraction Using Objects", *Concurrent Engineering: Research and Applications*, 1993, 1, 31-38.

Leontiev, Y. et al, "On Type Systems for Object-Oriented Database Programming Languages", *ACM Computing Surveys*, Dec. 2002, 34(4), 409-449.

Lim, J.B. et al, "Transaction Processing in Mobile, Heterogeneous Database Systems", *IEEE Trans. on Knowledge and Data Engineering*, 2002,14(6), 1330-1346.

Mallet, S. et al., "Myrtle: A Set-Oriented Meta-Interpreter Driven by a Relational Trace for Deductive Databases Debugging", *Lecture Notes in Computer Science*, 1999, 1559, 328-330.

Mariani, J. A., Oggetto: "An Object Oriented Database Layered on a Triple Store", *The Computer Journal* , 1992, 35(2),108-118.

McMahon, L.E, "SED-A Non-Interactive Text Editor", Bell Laboratories, Aug. 15, 1978, 10 pages.

"Mechanical Design Software (Buyers Guide)", *Computer-Aided Engineering*, Dec. 1993, 12(12), 32-36.

Melton, J. et al, "SQL and Management of External Data", *SIGMOD Record*, Mar. 2001, 30(1), 70-77.

Mitchell, W.J., "The Logic of Architecture", *Massachusetts Institute of Technology*, 1990, 139-143.

Navathe, S.B., "Evolution of Data Modeling for Databases," *Communications of the ACM*, Sep. 1992, 35(9), 112-123.

Nelson, M. et al, "Generic Support for Caching and Disconnected Operation", *4th Workshop on Workstation Operating Systems*, Oct. 1993, 61-65.

Nijssen, G.M. et al., "Conceptual Schema and Relational Database Design, A Fact Oriented Approach", *Department of Computer Science, University of Queensland, Prentice Hall*, 10-33, 42-43, 48-51, 156-170.

Oracle 9i SQL Reference, Release 2 (9.2), Mar. 2002, 13-89 to 13-90.

Orenstein, J, et al, "Query Processing in the Object Store Database System", *ACM SIGMOD International Conference on Management of Data*, Jun. 1992, 21(2),403-412.

Ottogalli, F.G. et al., "Visualisation of Distributed Applications for Performance Debugging", *Lecture Notes in Computer Science*, Jan. 2001, 2074, 831-840.

Pachet, et al, "A Combinatorial Approach to Content-Based Music Selection", *Multimedia Computing and Systems*, Jun. 7, 1999, 457-462.

Papiani, M. et al, "A Distributed Scientific Data Archive Using the Web, XML and SQL/MED", *SIGMOD Record*, Sep. 1999, 28(3), 56-62.

Powell, M., "Object, References, Identifiers, and Equality White Paper", (Jul. 2, 1993), OMG TC Document 93.7.5, 1-24.

Prosise, J., "2-D Drafting: Why Pay More?", *PC Magazine: The Independent Guide to IBM-Standard Personal Computing*, 1993, 12(4), 255-289.

Reiner, A. et al., "Benefits of X-based Three-Tier Client/Server Model with ESRI Applications", *Virtual Solutions*, 1995, 9 pages.

Read, III, B.C., "Developing the Next Generation Cockpit Display System", *IEEE Aerospace and Electronics Systems Magazine*, 1996, 11(10), 25-28.

Rouse, N.E., "CAD Pioneers are Still Trailblazing", *Machine Design*, Oct. 22, 1987, 59(25),117-122.

Roussopoulos, N. et al., "Using Semantic Networks for Data Base Management", *Proceedings of the 1st Supplemental VLDB Conference*, 1975, 144-172.

Santos, J.L.T. et al., "Computer Aided Mechanical Engineering Design Environment for Concurrent Design Process," *Proceedings of the 1993 ITEC Workshop on Concurrent Engineering*, May 4-6, 1993, Simulation in Concurrent Engineering, 71-83.

Seshadri, P., "Enhanced Abstract Data Types in Object-Relational Databases", *The VLDB Journal, The International Journal on Very Large Databases*, 1998, 7, 130-140.

Simon, A.R., *Strategic Database Technology: Management for the Year 2000*, 1995, pp. 6-9, 14-17, 55-57, Morgan Kaufmann Publishers.

Sreenath, N., "A Hybrid Computation Environment for Multibody Simulation", *Mathematics and Computers in Simulation*, 1992, 121-140.

Singhal, A. et al., "DDB: An Object Design Data Manager for VLSI CAD", *Association for Computer Machinery*, 1993, 467-470.

Stevens, T., "Value in 3-D", *Industry Week*, Jan. 8, 1995, 45-46.

Stonebraker, M., "The Case for Partial Indexes", *SIGMOD Record*, 1989, 18(4), 4-9.

Strickland, T.M., "Intersection of Relational and Object", *Proceedings of the AM/FM International Conference XVII*, Mar. 14-17, 1994, 69-75.

Sutherland, J. et al., "The Hybrid Object-Relational Architecture (HORA), An Integration of Object-Oriented and Relational Technology", *Applied Computing: States of the Art and Practice*, 1993, 326-333.

Suzuki, H. et al., "Geometric Modeling for Modeling Products", *Proceedings of the Third international Conference on Engineering Graphics and Descriptive Geometry*, Jul. 11-16, 1988, Vienna Austria, 2, 237-243.

Sreekanth, U. et al., "A Specification Environment for Configuring a Discrete-Part Manufacturing System Simulation Infrastructure", *International Conference on Systems, Man and Cybernetics*, Oct. 17-20, 1993, 1, 349-354.

Taylor, R.H. et al., "An Integrated Robot System Architecture", *Proceedings of the IEEE*, Jul. 1983, 71(7), 842-856.

Varlamis I. et al., "Bridging XML-Schema and Relational Databases. A System for generating and Manipulating Relational Databases using Valid XML Documents", *DocEng' Ol*, Nov. 9-10, 2001.

Wilcox, J., "Object Databases-Object Methods in Distributed Computing", *Dr. Dobbs Journal*, Nov. 1994, 19(13), 26-34.

Watanabe, S., "Knowledge Integration for Architectural Design", *Knowledge-Based Computer-Aided Architectural Design*, 1994, 123-146.

Waugh, A., "Specifying Metadata Standards for Metadata Tool Configuration", *Computer Networks and ISDN Systems*, 1998, 30, 23-32.

Wold, E. et al., "Content-Based Classification, Search, and Retrieval of Audio", *IEEE Multimedia, IEEE Computer Society*, 1996, 3, 27-36.

Yoshikawa, M. et al., "XRel: A Path-Based Approach to Storage and Retrieval of XML Documents Using Relational Databases", *ACM Transactional on Internet technology*, Aug. 2001, 1(1), 110-141.

\* cited by examiner

| T | Partner A | Partner B | Partner C |
|---|---|---|---|
| 0 | Initial State:<br>A10 [A10, B10, C10] | Initial State:<br>A10 [A10, B10, C10] | Initial State:<br>A10 [A10, B10, C10] |
| 1 | Local Update:<br>A11 [A11, B10, C10] | | |
| 2 | | Local Update:<br>B11 [A10, B11, C10] | |
| 3 | | | Sync with Partner B (No Conflict → Last Updated):<br>B11 [A10, B11, C10] |
| 4 | | Sync with Partner A (Conflict, Select Remote):<br>A11 [A11, B11, C10] | |
| 5 | | | Sync with Partner A (Conflict, Select Local):<br>B11 [A11, B11, C10] |
| 6 | Sync with Partner B (No Conflict → Last Updated):<br>A11 [A11, B11, C10] | | |
| 7 | Sync with Partner C (No changes detected...):<br><br>LOGICAL RROR! CONFLICT NOT DETECTED! | | |

FIG. 2

| T | Partner A | Partner B | Partner C |
|---|---|---|---|
| 0 | Initial State: A10, null, [A10, B10, C10] | Initial State: A10, null, [A10, B10, C10] | Initial State: A10, null, [A10, B10, C10] |
| 1 | Local Update: A11, null, [A11, B10, C10] | | |
| 2 | | Local Update: B11, null, [A10, B11, C10] | |
| 3 | | | Sync with Partner B (No Conflict, Last Updated): B11, null, [A10, B11, C10] |
| 4 | | Sync with Partner A (Conflict, Select Remote): A11, B12, [A11, B12, C10] | |
| 5 | | | Sync with Partner A (Conflict, Select Local): B11, C11, [A11, B11, C11] |
| 6 | Sync with Partner B (No Conflict, Last Updated): A11, B12, [A11, B12, C10] | | |
| 7 | Sync with Partner C (Conflict, SpecDet → A): A11, B12, [A11, B12, C11] | | |
| 8 | | Sync with Partner A (No Conflict, MetaD Update): A11, B12, [A11, B12, C11] | |
| 9 | | | Sync with Partner B (No Conflict, Last Updated): A11, C11, [A12, B12, C11] |

FIG. 4

| Event: | Resolution | Metadata |
|---|---|---|
| Special Handling | Winner Chosen Deterministically | < CVdet, CRVdet, AV1+AV2 > |
| Conflict Processing | Local Change Wins? | < CV1, CRVnew, AV1+AV2+ CRVnew > |
| | Remote Change Wins? | < CV2, CRVnew, AV1+AV2+ CRVnew > |
| | New Change Suggested? | < CV1 U CV2, CRVnew, AV1+ AV2+CRVnew > |
| New Local Change (not part of sync operation) | | < CVnew, null, AV1+CVnew > |

FIG. 5

SYSTEMS AND METHODS FOR THE PROPAGATION OF CONFLICT RESOLUTION TO ENFORCE ITEM CONVERGENCE (I.E., DATA CONVERGENCE)

CROSS-REFERENCE TO RELATED APPLICATIONS

This application claims benefit of U.S. Provisional Application No. 60/558,338, filed Apr. 1, 2004, entitled "SYSTEMS AND METHODS FOR THE PROPAGATION OF CONFLICT RESOLUTION TO ENFORCE ITEM CONVERGENCE (I.E., DATA CONVERGENCE)," the entire contents of which are hereby incorporated herein by reference.

This application is related by subject matter to the inventions disclosed in the following commonly assigned applications, the contents of which are hereby incorporated by reference into this present application in their entirety: U.S. patent application Ser. No. 10/646,575, filed on Aug. 21, 2003, entitled "SYSTEMS AND METHODS FOR INTERFACING APPLICATION PROGRAMS WITH AN ITEM-BASED STORAGE PLATFORM." U.S. patent application Ser. No. 10/646,646, filed on Aug. 21, 2003, entitled "STORAGE PLATFORM FOR ORGANIZING, SEARCHING, AND SHARING DATA"; U.S. patent application Ser. No. 10/692,515, filed on Oct. 24, 2003, entitled "SYSTEMS AND METHODS FOR PROVIDING SYNCHRONIZATION SERVICES FOR UNITS OF INFORMATION MANAGEABLE BY A HARDWARE/SOFTWARE INTERFACE SYSTEM"; U.S. patent application Ser. No. 10/692,508,filed on Oct. 24, 2003, entitled "SYSTEMS AND METHODS FOR PROVIDING RELATIONAL AND HIERARCHICAL SYNCHRONIZATION SERVICES FOR UNITS OF INFORMATION MANAGEABLE BY A HARDWARE/ SOFTWARE INTERFACE SYSTEM"; U.S. patent application Ser. No. 10/693,362, filed on Oct. 24, 2003, entitled "SYSTEMS AND METHODS FOR THE IMPLEMENTATION OF A SYNCHRONIZATION SCHEMAS FOR UNITS OF INFORMATION MANAGEABLE BY A HARDWARE/SOFTWARE INTERFACE SYSTEM"; and U.S. patent application Ser. No. 10/883,621, filed on Jun. 30, 2004, entitled "SYSTEMS AND METHODS FOR PROVIDING CONFLICT HANDLING FOR PEER-TO-PEER SYNCHRONIZATION OF UNITS OF INFORMATION MANAGEABLE BY A HARDWARE/SOFTWARE INTERFACE SYSTEM" (hereinafter collectively referred to as the "Foundational Patent Applications").

TECHNICAL FIELD

The present invention relates generally to the synchronization of data across computer systems and, more particularly, to resolving conflicts in a peer-to-peer synchronization system and propagating conflict resolutions in a manner that ensures item convergence (i.e., data convergence) (that is, data convergence based on the unit of change used for synchronization).

BACKGROUND

A conflict that occurs during synchronization can be resolved differently by different synchronization partners in a peer-to-peer synchronization environment. One such peer-to-peer synchronization environment and its underlying hardware/software interface system is disclosed in detail in the Foundational Patent Applications recited earlier herein. In summary, the Foundational Patent Applications describe a hardware/software interface system (such as, but not limited to, an operating system) where, among other things, autonomous units of storable information (Items) comprise several component change units (CUs) that constitute the basic data change element for synchronization. Each CU has associated metadata that enables the synchronization system to track what changes need to be updated on peer computer systems as well as what changes received from other peer computer systems should be applied.

One exemplary form of basic synchronization for systems using change units and metadata for synchronization (or similar structures) can be generally described in terms of a single change unit for an item that exists on two peer computer systems. In regard to this single change unit, a first peer, Partner A (or, more simply, "A"), requests changes from a second peer, Partner B (or, more simply, "B"), by transmitting to B its current metadata (Ma) pertaining to its replica of the change unit (CUa). Partner B, upon receiving Ma (corresponding to CUa), compares this metadata with its own metadata (Mb) for its replica of the same change unit (CUb). Then, if Mb reflects any changes to CUb that are not reflected in Ma, B transmits both CUb and Mb to A; otherwise B only transmits its Mb to A (or, alternately, transmits a "no updates" indicator to A) since CUa already reflects all updates made to CUb and thus copying CUb from B to A is unnecessary.

Based on B's response to its sync request, if A receives only Mb back from B (or, alternately, a "no update" indicator) but no CUb then A knows that CUa is either the same as or more updated than CUb. However, if A receives both Mb and CUb back from B, then A must then determine, by a comparison of Ma to Mb, whether CUb is more updated than CUa or whether CUa and CUb have conflicting changes. If CUb is more updated than CUa, A then updates CUa with CUb and A also updates Ma with Mb. On the other hand, if CUa and CUb have conflicting changes, then A resolves that conflict according to its local conflict resolution procedures. For example, if A's conflict resolution procedure in this case is to choose a local solution over a remote solution, the A would continue to retain CUa (rejecting CUb's changes) and update Ma to include all updates already reflection Ma and Mb (the union of Ma and Mb). Thereafter, when B then syncs with A using the same procedure (and presuming no intervening additional changes), it will conclude that CUa is more updated that CUb and update CUb with CUa.

This basic change-unit-and-metadata (CUAM) approach to synchronization is simple and effective for a two-peer synchronization community. However, with three or more peers, this simple approach can result in divergence of the data such that two systems may reach different conflict resolution solutions but have identical metadata, and thus the logical inconsistency cannot be recognized nor adequately corrected in the peer community. A detailed example of this phenomenon is provided later herein.

In order to force the data on all peers to converge, what is needed in the art is a synchronization methodology for synchronization systems of various types to correctly identify and propagate specific conflict resolutions between the peers in a synchronization community and arbitrate between differing resolutions for the same conflict in order to ensure the consistent convergence onto a single resolution of the conflict across all relevant peers.

SUMMARY

Various embodiments of the present invention are directed to systems and method for detecting conflicts and applying conflict resolutions during manual and automatic conflict resolution operations. Several embodiments are directed to preventing both: (a) non-convergence of conflict resolutions, where partners can end up in a divergent steady state (i.e. have different data in the absence of outstanding conflicts); and (b) a non-terminating ping-pong of conflict resolutions between partners (which can occur with certain inefficient solutions that continuously update metadata for each conflict resolution without end). Certain specific embodiments of the present invention are directed to a method for maintaining knowledge that guarantees convergence of data, even when different partners apply different conflict resolutions.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 2 is a table-based time-flow diagram illustrating a three-peer synchronization operation that ultimately results in non-convergence of conflict resolutions (where partners can end up in a divergent steady state);

FIG. 4 is a table-based time-flow diagram illustrating a three-peer synchronization operation that ultimately results in convergence of conflict resolutions; and FIG. 5 is a table illustrating the resultant metadata for special handling and conflict processing for certain end-states resulting from the process illustrated in FIG. 4, as well as metadata pertaining to new local changes (for comparison purposes since new local changes are not directly part of the sync operation).

DETAILED DESCRIPTION

The subject matter is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Computer Environment

Figure 1:
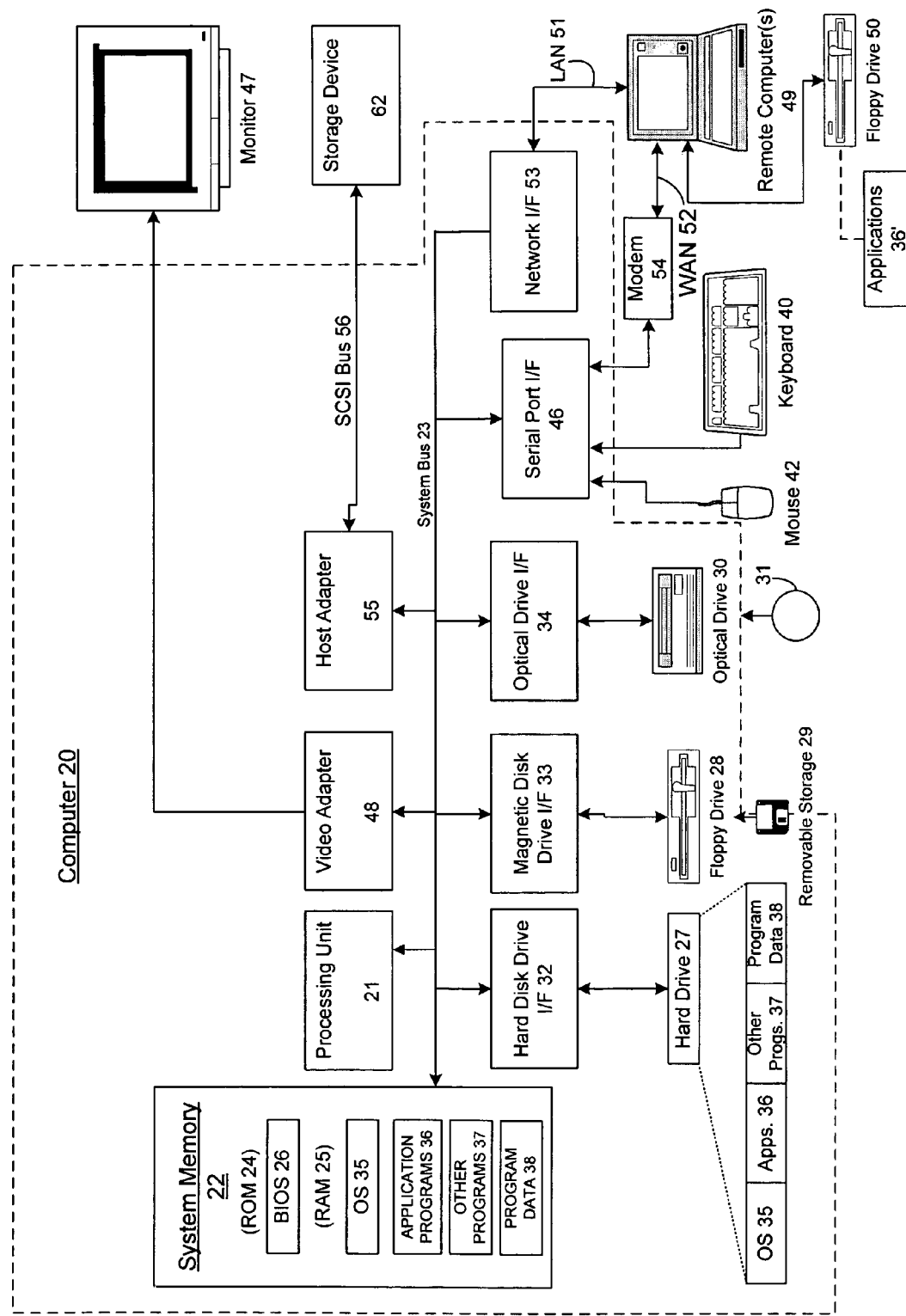
FIG. 1 is a block diagram representing a computer system in which aspects of the present invention may be incorporated.

Numerous embodiments of the present invention may execute on a computer. FIG. 1 and the following discussion is intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand held devices, multi processor systems, microprocessor based or programmable consumer electronics, network PCs, minicomputers, mainframe computers and the like.: The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter

55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

While it is envisioned that numerous embodiments of the present invention are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

Basic Synchronization Schema and Item Divergence

For certain embodiments of the present invention, such as for an Item-based system, a "change unit" is essentially a set of properties that are always synchronized as a unit. For example, the First Name and Last Name properties of a Contact Item may together comprise a single change unit. In addition, a "version" is associated with each change unit to represent the last partner to have made a particular change to that change unit along with a timestamp corresponding to when the update was made. Thus, as used herein, and for simplicity of notation, partners are represented by letters and timestamps are represented by increasing integer numbers such that, by simply pairing the partner (e.g., "A") and a timestamp (e.g., "1"), each change unit has associated with it a unique identification number reflecting the latest changes made by each partner at a specific time—e.g., "A1".

For a basic synchronization schema such as the one described earlier herein (which may result in data non-convergence), the metadata for each change unit comprises two components: a current version (cv) indicating the current "update" status of the change unit, as well as an awareness vector (av) (a.k.a. an "array of versions") corresponding to the updates that have occurred to said change unit for each partner in the peer community (or at least those partners that have made any changes). A typical format for change unit metadata is <change version, awareness vector> or, more simply, <cv, [av]>. Together this information can be used to readily determine that, for example, a change unit on partner A (CUa)
having metadata (Ma) of <A13, [A13, B11]> is more updated than a change unit on partner B (CUb) having metadata (Mb) of <B11, [A12, B11]> because Ma includes changes (namely A13) that are not reflected in Mb given that the timestamp portion of each version number is incrementally increasing with time.

FIG. 2 is a table-based time-flow diagram illustrating a three-peer synchronization operation (for a three-partner sync community) that ultimately results in non-convergence of conflict resolutions (where partners can end up in a divergent steady state). The first column in the table "T" corresponds to the relative timeline of events, while the second, third, and fourth columns corresponds to activity on each of three partner systems A, B, and C in the sync community. For convenience, and as illustrated, the initial state at time 0 for the change unit replica on each partner A, B, and C starts in a fully-synchronized state where the change unit replica for each partner A, B, and C (each replica being individually represented by the data of each corresponding column).

At time 1, A updates the data in its replica of the change unit (hereinafter CUa) and reflects that update by incrementing the cv with a new value (A11) and updating the av to reflect the updated state. At time 2, B also independently updates the data in its replica of the change unit (hereinafter CUb) and updates the cv and av appropriately.

At time 3, the first synchronization operation occurs with C syncing with B. In operation, and using the logic previously discussed herein, C sends its metadata (Mc) to B and B, in response, sends both a copy of its change unit (CUb) and its associated metadata (Mb) to C for further processing. C, upon receipt of CUb and Mb, ascertains that CUb and Mb are more current than CUc and Mc because the "B11" version in B's awareness vector (AVb) is not reflected in C's awareness vector (AVc) while all of AVc is reflected in AVb), thus meaning that CUb was "last updated" (is more up to date) with regard to CUc. As a result, C updates CUc with the data from CUb and further updates the associated metadata Mc with the metadata from Mb.

At time 4, B then syncs with partner A and, after receiving A's change unit (CUa) and metadata (Ma) (per the logically discussed by hereinafter omitted for convenience), B ascertains that there is a conflict because both B and A have independently made changes to their respective change unit replicas CUb and CUa. B then employs its conflict resolution processes (which, in this example, are to "Select Remote," that is, choose the remote version over its local version) to choose CUa over CUb (copying CUa's data to CUb) and reflecting this resolution in the metadata changing its current version (CVb) to A11 and merging together the awareness vectors for both B and A (AVb and AVa).

At time 5, C then syncs with partner A and, after receiving A's change unit (CUa) and metadata (Ma), C also ascertains that there is a conflict because both C and A have independently made changes to their respective change unit-replicas CUc and CUa (though, in truth, CUc's changes were really the result of C previously syncing with B at time 3, although this distinction is not important). Because of the conflict, C then employs its conflict resolution processes (which, in this example, are to "Select Local," that is, choose its local version over the remote version) to choose CUc over CUa (where no additional copying of change unit data is necessary) and reflecting this resolution in the metadata by retaining its current version (CVc) as B11 and merging together the awareness vectors for both C and A (AVc and AVa).

At time 6, A then syncs with B and, based on the exchanged metadata (A sending Ma to B, and then B return Mb along with CUa to A), A recognizes that CUb and Mb are more updated than CUa and Ma (because, while MB reflects all of Ma, Mb also reflects version B11 while Ma does not) and thus A applies CUb and Mb to its CUa and Ma (although it should be noted that, in this case, CUb and CUa are in fact the same, A11, and so in alternative embodiments B might recognize this fact and not send CUb or A might not copy CUb to CUa).

Lastly, at time 7, A then syncs with C but, because Ma is identical to Mc, C does not send CUc to A, and thus the data for CUa and CUc on A and C respectively has diverged, a state that cannot be recognized, must less reconciled, by the current synchronization system.

Conflict Resolution Propagation

Several embodiments of the present invention are direct to systems and methods for detecting conflicts and applying conflict resolutions during manual and automatic conflict resolution operations since different peers ("partners") may resolve the same conflict differently such as, for example, when there is a conflict between versions A1 and B2 that is resolved by partner X in favor of A1 and by partner Y is in favor of B2.

Various embodiments of the present invention employ one or more methods that prevent non-convergence of conflict resolutions (where partners can end up in a divergent steady state, such as by having different data in the absence of outstanding conflicts) and a nonterminating ping-pong of conflict resolutions between partners.

For several embodiments of the present invention, the metadata for the synchronization, in addition to comprising a current version (cv) and an awareness vector (av), further comprises a conflict resolution version (crv) to specifically track conflict resolutions that might lead to a divergent state. Based on the addition of the crv to the metadata for a change unit, the synchronization process is modified to utilize this new element in the metadata as described herein. For convenience, said synchronization metadata comprising a cv, a crv, and an av can be represented in the form of <cv, crv, [av]> for each change unit replica (e.g., <A10, B12, [A11, B12, C10]>.

Figure 3:
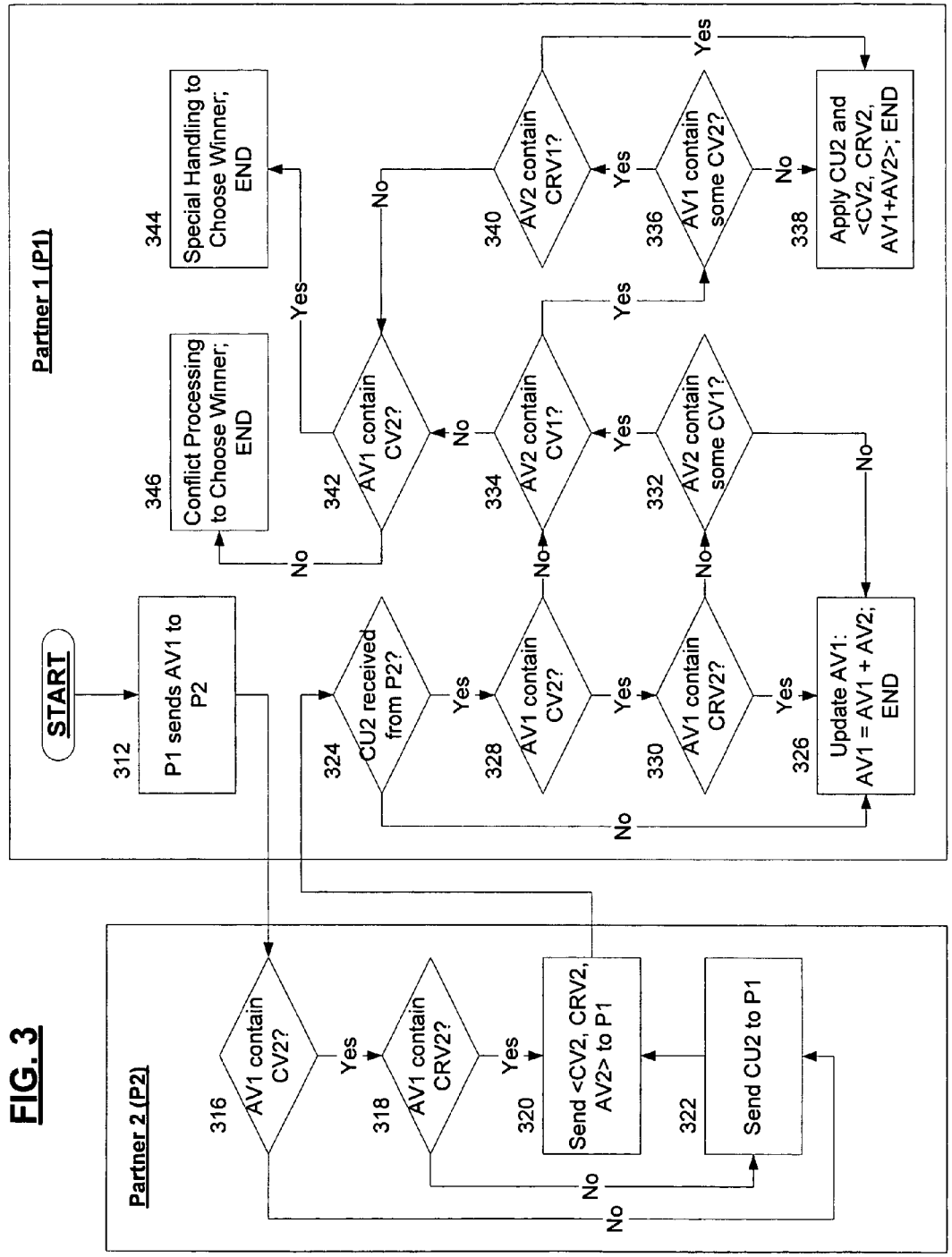
FIG. 3 is a process flow diagram illustrating an improved synchronization process utilized by several embodiments of the present invention.

FIG. 3 is a process flow diagram illustrating an improved synchronization process utilized by several embodiments of the present invention based on the addition of crv to the metadata and other processes for modifying the metadata as described herein. In the figure, the process starts at step 312 when a first partner P1 (the partner seeking to sync with another peer) initiates a sync operation with a second partner P2 by sending its awareness vector (AV1) for its local change unit replica (CU1) to P2. After P2 receives AV1 from P1, at step 316 P2 first determines if AV1 contains the current version (CV2) for its own local but corresponding change unit replica (CU2) and, if so, at step 318 P2 also determines if AV1 also contains the conflict resolution version (CRV2) for CU2 (if any). If AV1 meets both of these conditions, then at step 320 P2 immediately sends its metadata (M2) for CU2—comprising CV2, CRV2, and AV2—to P1 without sending CU2 itself; otherwise, at step 322, P2 sends CU2 to P1 as well as, at step 320, M2.

Returning to P1, and at step 324, P1 first determines if it received CU2 from P2. If not, then P1 can conclude that its change unit replica (CU1) reflects the most recent updates as between P1 and P2, and so at step 326 P1 merely updates AV1 with AV2 (if necessary) so that AV1 reflects all update versions in AV2 (if it does not already do so) and the synchronization process ends.

Conversely, if P1 does indeed receive CU2 from P2 at step 324, then at step 328 P1 must first determine if AV1 contains the version reflected by CU2 and, if so, if AV1 also contains the version reflected by CRV2 at step 330. If so, then P1 again proceeds to step 326 to update AV1 (if necessary) and the sync process ends. On the other hand, if at step 328 P1 determines that AV1 does contain the version reflected by CV2 but that, at step 330, AV1 does not contain the version reflected by CRV2, then at step 332 P1 determines if AV2 contains at least some of the versions reflected by CV1—the word "some" anticipating that, for certain alternative embodiments, CV1 may be a set of multiple cv values, but in a single cv value case such as in this example, this is the same as containing the cv value at issue (and thus is somewhat duplicative of step 334 for single-cv sets) and thus should automatically proceed to step 334 in a single-cv case, which is the case used throughout—and, if not, then at step 326 P1 again updates AV1 with AV2 (if necessary) and the sync process ends.

In contrast, if instead at step 328 AV1 does not contain CV2, or if at step 332 AV2 does indeed contain some CV1, then at step 334 P1 next determines if AV2 contains CV1. If not, then at step 336 P1 ascertains whether AV1 contains at least some of the versions reflected by CV2 and, if not, at step 338 P1 applies (or copies the data from) CU2 to CU1 and sets the corresponding metadata M1 (comprising CV1, CRV1, AV1) to the values of <CV2, CRV2, AV1+AV2> (where AV1+AV2 is the union of latest versions from each awareness vector, for example, if AV1=[A11, B10, C10] and AV2=[A10, B11, C12], then AV1+AV2=[A11, B11, C12]) and the sync process ends. But if at step 336 P1 instead determines that AV1 does indeed contain some CV2, then at step 340 P1 also determines if AV2 contains CRV1 and, if so, then P1 again proceeds to step 338 to apply CU2 as previously described and the sync process ends.

In the alternative, if at step 334 P1 instead determines that AV2 does not contain CV1, or if at step 340 P1 instead determines that AV2 does not contain CRV1, then in either case P1, at step 342, ascertains if AV1 contains CV2 and, if so, then at step 344 P1 employs "Special Handling" to choose a solution (because there is no conflict) and thereafter ends the sync process, or if not, then at step 346 P1 initiates "Conflict Processing" (or conflict resolution processing) to resolve the conflict and choose a winner between the two sets of data and ends the sync process.

Advanced Synchronization Schema and Item Convergence (i.e., Data Convergence)

By using the foregoing methodology as described illustrated in FIG. 3, the situation is avoided where two change unit replicas having different change: unit values but having the same metadata (as was the case with the basic synchronization schema) are not recognized and left in a divergent state, and FIG. 4 illustrates this point using a scenario similar to that illustrated in FIG. 2 but applying the inventive methodology illustrated in FIG. 3.

More specifically, FIG. 4 is a table-based time-flow diagram illustrating a three-peer synchronization operation that ultimately results in convergence of conflict resolutions. In addition, FIG. 5 is a table illustrating the resultant metadata for special handling and conflict processing for certain end-states resulting from the process illustrated in FIG. 3, as well as metadata pertaining to new local changes (for comparison purposes since new local changes are not directly part of the sync operation but an understanding of how metadata changes for local updates such as described herein below at times 1 and 2).

Referring again to FIG. 4, the first column in the table "T" once again corresponds to the relative timeline of events, while the second, third, and fourth columns corresponds to activity on each of three partner systems A, B, and C in the sync community. For convenience, and as illustrated, the initial state at time 0 for the change unit replica on each partner A, B, and C starts in a fully-synchronized state where the change unit replica for each partner A, B, and C (each replica being individually represented by the data of each corresponding column).

At time 1, A updates the data in its replica of the change unit (hereinafter CUa) and reflects that update by incrementing its current version (cv) with a new value (A11), updating the awareness vector (av) to reflect the updated state, and no update is made to the conflict resolution version (crv) (since no conflict was resolved). At time 2, B also independently updates the data in its replica of the change unit (hereinafter CUb) and updates its corresponding metadata (Mb) components appropriately as shown. (Hereinafter, for convenience, each partners cv, crv and av are denoted on a per-partner basis, e.g., CVa, CRVa, and AVa for the metadata components of peer A, and similar nomenclature for corresponding metadata on partners B and C. The same thing applies to the collective metadata, e.g., Ma for system A, and for the change unit, e.g., CUa for system A, and so on and so forth.)

At time 3, the first synchronization operation occurs with C syncing with B. Using the method illustrated by the flowchart of FIG. 3, C sends AVc to B and B returns to C both CUb and Mb. Analyzing Mb and Mc, C is able to determine that CUb is more updated than CUc and ultimately applies CUb (i.e., copies CUb to CUc) and updates its metadata Mc components CVc, CRVc, and AVc to values equivalent to <CVb, CRVb, AVc+AVb> (where AVc+AVb is the union of AVc and AVb as previously described earlier herein). More specifically, and in regard to the process illustrated by FIG. 3, the logical processing traverses the following steps in order: 312, 316, 322, 320, 324, 328, 334, 336, 340, and 338. Note that the result is similar to the result one would expect from the basic synchronization system described earlier herein.

Referring again to FIG. 4, and at time 4, B then syncs with partner A and, after receiving A's change unit (CUa) and metadata (Ma) (again in accordance with the method illustrated by the flowchart of FIG. 3), B ascertains that there is a conflict because both B and A have independently made changes to their respective change unit replicas Cub and CUa and employs its conflict resolution process. More specifically, and in regard to the process illustrated by FIG. 3, the logical processing traverses the following steps in order: 312, 316, 322, 320, 324, 328, 334, 342, and 346. To resolve the conflict, and in accordance with its conflict resolution procedures, B chooses the remote update over the local update, and the resulting metadata values for Mb, as illustrated in FIG. 5, are <CVa, CRVnew, AVa+AVb+CRVnew> where the "new" for CRVnew is the next incremental update version for Partner B (e.g., in this example the last update version was B11 for the change at time 2, so the next incremental update version for the present conflict resolution is B12) and both the CRVb and the AVb (but not the CVb) reflect this new value as shown in FIG. 4 for the end state of Mb at time 4.

At time 5, C then syncs with partner A and, after receiving A's change unit (CUa) and metadata (Ma), C also ascertains (via the process of FIG. 3 which traverses, in order: 312, 316, 322, 320, 324, 328, 334, 342, and 346) that there is a conflict because both C and A have independently made changes to their respective change unit replicas CUc and CUa (though, in truth, CUc's changes were really the result of C previously syncing with B at time 3, although this distinction is not important). Because of the conflict, C then employs its conflict resolution processes (which, in this example, are to select local updates over remote updates) to choose CUc over CUa, and this choice is reflected in the metadata, as illustrated in FIG. 5, as <CVc, CRVnew, AVa+AVc+CRVnew> where, again, CRVnew is the next incremental update version for Partner C (e.g., in this example, C11) and is reflected by both the resultant CRVc and the resultant AVc (but not the CVc) as shown in FIG. 4 for the end state of Mc at time 5.

At time 6, A then syncs with B and, based on the exchanged metadata (A sending Ma to B, and then B return Mb along with CUa to A), A recognizes that CUb and Mb are more updated than CUa and Ma (because, while MB reflects all of Ma, Mb also reflects version B11 while Ma does not) and thus A applies CUb and Mb values to its CUa and Ma as shown (although it should be noted that, in this case, CUb and CUa are in fact the same, A11, and so in alternative embodiments B might recognize this fact and not send CUb or A might not copy CUb to CUa). In regard to FIG. 3, the specific traversal for this synchronization is, in order: 312, 316, 318, 322, 320, 324, 328, 334, 336, 340, and 338.

Returning again to FIG. 4, and at time 7, A then syncs with C but, because of the utilization of the conflict resolution version (crv) and its logical incorporation into the awareness version (av) as previously described herein when conflicts have arisen, Ma is no longer identical to Mc (which was the case using the standard synchronization schema), and so C does indeed send CUc and Mc to A for further processing (according to the process described by FIG. 3), and A ultimately resorts to special handling (via the traversal of the process of FIG. 3 of the following steps in order: 312, 316, 318, 322, 320, 324, 328, 330, 332, 334, 336, 340, 342, and 344). This special handling, specifically intended to enforce item convergence (i.e., data convergence), then employs a methodology to reach a deterministic solution that ensures the universal selection of one update over the other in the sync community (e.g., in this example, the update having the lowest update number which, again, is a combination of the unique computer system i.d. and a timestamp for said update). This solution is then coupled with updated metadata of <CVdet, CRVdet, AV1+AV2> as shown in FIG. 5 or, in the present case where the corresponding value of "A11" is less than the corresponding value of "B11" and thus A11 is the determined solution, the metadata becomes <CVa, CRVa, AVa+AVc> with the values shown in FIG. 4 at time 7.

At time 8 and time 9 of FIG. 4, it then becomes readily apparent how this special handling solution at time 7 propagates through the sync community and ultimately results in item convergence (i.e., data convergence) (i.e., data convergence) (where the change unit on each system is again identical). At time 6, the logical process traversal of the methodology (via steps 312, 316, 318, 320, 324, and 326 of the process illustrated in FIG. 3) results in an update of the AVb of Mb. At time 7, the logical process traversal of the methodology (via steps 312, 316, 318, 322, 320, 324, 328, 330, 332, 334, 336, 340, and 338 of the process illustrated in FIG. 3) results in the application of CUb and Mb to CUc and Mc where the resultant metadata Mc comprises values equivalent to <CUb, CRVb, AVb+AVc>.

Alternative Method for Item Convergence (i.e., Data Convergence)

In an alternative embodiment of the present invention, item convergence (i.e., data convergence) is also ensured by employing the special handling deterministic approach to all conflict resolutions at the time of the conflict. However, while this method would enable even the basic synchronization schema to ensure item convergence (i.e., data convergence), it also introduces an arbitrary resolution to conflicts that may not necessarily diverge, and thus is not as robust as the advanced synchronization methodology described earlier herein.

Conclusion

The various system, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input-device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on, a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

What is claimed:

1. A computer-implemented method for synchronizing change unit data between a first computer system and a second computer system, said first computer system comprising a first replica of said change unit data and a first metadata corresponding to said first replica, said first metadata comprising a first change version, a first conflict resolution version, and a first awareness vector, and said second computer system comprising a second replica of said change unit data and a second metadata corresponding to said second replica, said second metadata comprising a second change version, a second conflict resolution version, and a second awareness vector, said method comprising the following steps:
   sending the first awareness vector from the first computer system to the second computer system;
   determining if the first awareness vector contains the second change version and the second conflict resolution version and, if so, sending the second replica of said change unit data from the second computer system to the first computer system;
   sending the second metadata from the second computer system to the first computer system;
   if the second replica of said change unit data was not sent from the second computer system to the first computer system, updating the first awareness vector and ending the method for synchronizing change unit data;
   if the second replica of said change unit data was sent from the second computer system to the first computer system, determining whether the first awareness vector contains the second change version and the second conflict resolution version and, if so, updating the first awareness vector and ending the method for synchronizing change unit data;
   if the first awareness vector contains the second change version but not the second conflict resolution version, then determining whether the second awareness vector contains at least one version reflected by the first change version and, if not, updating the first awareness vector and ending the method for synchronizing change unit data;
   if the first awareness vector does not contain the second change version or if the second awareness vector contains at least one version reflected by the first change version, then determining whether the second awareness vector contains the first change version and, if so, then applying the second replica of the change unit data and updating the metadata if the first awareness vector does not contain at least one version reflected by the second change version or if the first awareness vector contains at least one version reflected by the second change version and the second awareness vector contains the first conflict resolution version;
   if the second awareness vector does not contain the first change version but the first awareness vector contains the second change version or if the second awareness vector does not contain the first conflict resolution version, then deterministically selecting a change unit solution to ensure convergence of change unit data;
   if the first awareness vector does not contain the second change version and the second awareness vector does not contain the first change version, then determining that a conflict has occurred and resolving the conflict; and,
   updating the first replica of said change unit data and the first metadata and, if a conflict has arisen, further updating the first conflict resolution version and the first awareness vector to reflect a conflict resolution and thereby preventing a divergent state from arising.

2. A computer-readable storage medium comprising computer-readable instructions when executed by a processor cause the processor to perform a method of synchronizing change unit data between a first computer system and a second computer system, said first computer system comprising a first replica of said change unit data and a first metadata corresponding to said first replica, said first metadata comprising a first change version, a first conflict resolution version, and a first awareness vector, and said second computer system comprising a second replica of said change unit data and a second metadata corresponding to said second replica, said second metadata comprising a second change version, a second conflict resolution version, and a second awareness vector, said computer-readable instructions comprising instructions for:

- sending the first awareness vector from the first computer system to the second computer system;
- determining if the first awareness vector contains the second change version and the second conflict resolution version and, if so, sending the second replica of said change unit data from the second computer system to the first computer system;
- sending the second metadata from the second computer system to the first computer system;
- if the second replica of said change unit data was not sent from the second computer system to the first computer system, updating the first awareness vector and ending the method for synchronizing change unit data;
- if the second replica of said change unit data was sent from the second computer system to the first computer system, determining whether the first awareness vector contains the second change version and the second conflict resolution version and, if so, updating the first awareness vector and ending the method for synchronizing change unit data;
- if the first awareness vector contains the second change version but not the second conflict resolution version, then determining whether the second awareness vector contains at least one version reflected by the first change version and, if not, updating the first awareness vector and ending the method for synchronizing change unit data;
- if the first awareness vector does not contain the second change version or if the second awareness vector contains at least one version reflected by the first change version, then determining whether the second awareness vector contains the first change version and, if so, then applying the second replica of the change unit data and updating the metadata if the first awareness vector does not contain at least one version reflected by the second change version or if the first awareness vector contains at least one version reflected by the second change version and the second awareness vector contains the first conflict resolution version;
- if the second awareness vector does not contain the first change version but the first awareness vector contains the second change version or if the second awareness vector does not contain the first conflict resolution version, then deterministically selecting a change unit solution to ensure convergence of change unit data;
- if the first awareness vector does not contain the second change version and the second awareness vector does not contain the first change version, then determining that a conflict has occurred and resolving the conflict; and
- updating the first replica of said change unit data and the first metadata and, if a conflict has arisen, further updating the first conflict resolution version and the first awareness vector to reflect a conflict resolution and thereby preventing a divergent state from arising.

3. A hardware control device for synchronizing change unit data between a first computer system and a second computer system, said first computer system comprising a first replica of said change unit data and a first metadata corresponding to said first replica, said first metadata comprising a first change version, a first conflict resolution version, and a first awareness vector, and said second computer system comprising a second replica of said change unit data and a second metadata corresponding to said second replica, said second metadata comprising a second change version, a second conflict resolution version, and a second awareness vector, said hardware control device comprising means for:

- sending the first awareness vector from the first computer system to the second computer system;
- determining if the first awareness vector contains the second change version and the second conflict resolution version and, if so, sending the second replica of said change unit data from the second computer system to the first computer system;
- sending the second metadata from the second computer system to the first computer system;
- if the second replica of said change unit data was not sent from the second computer system to the first computer system, updating the first awareness vector and ending the method for synchronizing change unit data;
- if the second replica of said change unit data was sent from the second computer system to the first computer system, determining whether the first awareness vector contains the second change version and the second conflict resolution version and, if so, updating the first awareness vector and ending the method for synchronizing change unit data;
- if the first awareness vector contains the second change version but not the second conflict resolution version, then determining whether the second awareness vector contains at least one version reflected by the first change version and, if not, updating the first awareness vector and ending the method for synchronizing change unit data;
- if the first awareness vector does not contain the second change version or if the second awareness vector contains at least one version reflected by the first change version, then determining whether the second awareness vector contains the first change version and, if so, then applying the second replica of the change unit data and updating the metadata if the first awareness vector does not contain at least one version reflected by the second change version or if the first awareness vector contains at least one version reflected by the second change version and the second awareness vector contains the first conflict resolution version;
- if the second awareness vector does not contain the first change version but the first awareness vector contains the second change version or if the second awareness vector does not contain the first conflict resolution version, then deterministically selecting a change unit solution to ensure convergence of change unit data;
- if the first awareness vector does not contain the second change version and the second awareness vector does not contain the first change version, then determining that a conflict has occurred and resolving the conflict; and
- updating the first replica of said change unit data and the first metadata and, if a conflict has arisen, further updating the first conflict resolution version and the first awareness vector to reflect a conflict resolution and thereby preventing a divergent state from arising.

* * * * *